(12) United States Patent
Panas

(10) Patent No.: US 11,030,148 B2
(45) Date of Patent: Jun. 8, 2021

(54) MASSIVELY PARALLEL HIERARCHICAL CONTROL SYSTEM AND METHOD

(71) Applicant: Lawrence Livermore National Security, LLC, Livermore, CA (US)

(72) Inventor: Robert Panas, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 536 days.

(21) Appl. No.: 15/945,477

(22) Filed: Apr. 4, 2018

(65) Prior Publication Data

US 2019/0310965 A1  Oct. 10, 2019

(51) Int. Cl.
| | |
|---|---|
| G06F 13/37 | (2006.01) |
| G06F 15/82 | (2006.01) |
| G05B 13/02 | (2006.01) |
| G02B 26/08 | (2006.01) |
| G06F 13/12 | (2006.01) |

(52) U.S. Cl.
CPC ....... G06F 15/825 (2013.01); G02B 26/0833 (2013.01); G05B 13/021 (2013.01); G06F 13/126 (2013.01); G06F 13/37 (2013.01)

(58) Field of Classification Search
CPC ...... G06F 15/825; G06F 13/126; G06F 13/37; G02B 26/0833; G05B 13/021
See application file for complete search history.

(56) References Cited

U.S. PATENT DOCUMENTS

| | | | |
|---|---|---|---|
| 7,697,641 B2 * | 4/2010 | Haddadin | H04B 1/28 375/340 |
| 2002/0103550 A1 | 8/2002 | Andrews | |
| 2003/0064743 A1 | 4/2003 | Chen | |
| 2004/0105664 A1 * | 6/2004 | Ivankovic | H02P 7/29 388/800 |
| 2007/0033435 A1 | 2/2007 | Stange et al. | |

(Continued)

FOREIGN PATENT DOCUMENTS

WO  WO-2006015983 A1  2/2006

OTHER PUBLICATIONS

International Search Report and Written Opinion for Corresponding Application No. PCT/US2019/013622, dated Apr. 29, 2019.

*Primary Examiner* — Gregory J Toatley, Jr.
*Assistant Examiner* — Lynda Dinh
(74) *Attorney, Agent, or Firm* — Harness, Dickey & Pierce, P.L.C.

(57) ABSTRACT

An electronic control system is disclosed for controlling individually controllable elements of an external component. In one embodiment the system may include a state translator subsystem for receiving a state command from an external subsystem. The state translator subsystem may have at least one module for processing the state command and generating operational commands for controlling the elements to achieve a desired state or condition. A programmable calibration command translation layer (PCCTL) subsystem may be included which receives and uses the operational commands to generate granular level commands for controlling the elements. A feedback control layer subsystem may be included which applies the granular level commands to the elements, and further modifies the granular level commands as needed to control the elements in closed loop fashion.

16 Claims, 4 Drawing Sheets

(56) References Cited

U.S. PATENT DOCUMENTS

| | | | |
|---|---|---|---|
| 2010/0312992 A1* | 12/2010 | Wakabayashi | G06F 9/3851 |
| | | | 712/214 |
| 2013/0150984 A1* | 6/2013 | Nigro | G05B 11/42 |
| | | | 700/37 |
| 2015/0103984 A1 | 4/2015 | Peterson | |
| 2015/0234777 A1* | 8/2015 | Fish, III | G06F 9/30138 |
| | | | 712/29 |
| 2018/0293102 A1* | 10/2018 | Ray | G06T 1/20 |

* cited by examiner

MASSIVELY PARALLEL HIERARCHICAL CONTROL SYSTEM AND METHOD

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to control systems, and more particularly to an electronic control system and method for driving and coordinating a large number of control systems in parallel while efficiently handling multiple layers of information transfer, minimizing data flow, and minimizing latency issues for communications with external controllers.

BACKGROUND

This section provides background information related to the present disclosure which is not necessarily prior art.

The precision control of closed loop systems often demands a high rate of data transfer to calculate the desired system state, read the present system state, determine the appropriate corrective action, and pass the actuation command back out to the system. The latency in this operation has a significant impact on the system's performance, limiting its control bandwidth. This problem is further exacerbated when multiple control systems are to be driven in parallel, such as in the case of microarrays.

The general solution for driving microarrays of motion systems, or elements, such as micro-mirrors, is to operate in open loop. This avoids the challenge of the return data transfer. Such systems often also implement chained operation, where large numbers of systems have their inputs linked together. Thus, a single command drives many systems. In this case, chained open-loop operation can be made to operate at relatively low bandwidth. The tradeoff is that independent control of the systems is lost, as is closed-loop stability. In the more complex applications for microarrays, for example, the individual array elements must be driven by different commands. This requires a data channel for each element. If precision operation is desired for the elements, then closed-loop feedback control is generally necessary for each element. Closed loop feedback control means reading the present state of the element from sensors, comparing this state to the target commanded state, and using these state readings to modulate the command in order to achieve the target state value. This feedback process allows the system to observe and reject disturbances caused by error sources such as unwanted dynamics, drift, thermal variation, vibration, acceleration or even manufacturing variation. Correct use of feedback control provides a means to stabilize the system performance against both internal and external sources of variation. In the example of controlling micromirror array elements, such stability is critical to reaching precision performance targets. The drawback of the improved performance is the increased data channel requirements, as noted previously.

A conventional solution to handling multiple control systems is to use a faster centralized processing system. While this will work up to a point, the conventional plan to centralize the command operations begins to run into the limitations of electronics as the array size of feedback control elements increases.

SUMMARY

This section provides a general summary of the disclosure, and is not a comprehensive disclosure of its full scope or all of its features.

In one aspect the present disclosure relates to an electronic control system for controlling individually controllable elements of an external component. The system may comprise a state translator subsystem for receiving a state command from an external subsystem. The state translator subsystem may include at least one module for processing the state command and generating operational commands for controlling the elements of the external component to achieve a desired state or condition. The system may also include a programmable calibration command translation layer (PCCTL) subsystem configured to receive the operational commands and to use the operational commands to generate granular level commands for controlling the elements. The system may further include a feedback control layer subsystem configured to receive the granular level commands and to generate final output commands to the elements. The feedback control layer subsystem may also be used to further modify the final output commands as needed to control the elements in closed loop fashion.

In another aspect the present disclosure relates to an electronic control system for controlling individually controllable elements of an external component. The system may comprise a state translator subsystem for receiving a state command from an external subsystem. The state translator subsystem may include at least one module for processing the state command and generating operational commands, over a first plurality of channels in parallel form, for individually controlling the elements of the external component such that the external component achieves a desired state or condition. The system may also include a programmable calibration command translation layer (PCCTL) subsystem. The PCCTL subsystem may be configured to receive calibration information from an external calibration data source, and further configured to receive the operational commands, and to use both the calibration information and the operational commands to generate granular level commands for controlling the elements, and to transmit the granular level commands over a second plurality of channels in parallel form. The system may further include a feedback control layer subsystem configured to receive the granular level commands from the PCCTL subsystem. The feedback control layer subsystem may use the granular level commands to generate final output commands which are applied in parallel, over a third plurality of channels, to the elements, and to further monitor operation of the elements, and to modify the final output commands, in a closed loop fashion, as needed in real time to carry out the state command.

In still another aspect the present disclosure relates to a control method for controlling individually controllable elements of an external component. The method may comprise using a state translator subsystem to receive a state command from an external subsystem. The state translator subsystem may use at least one module for processing the state command and generating operational commands for controlling the elements of the external component to achieve a desired state or condition. The method may also involve using a programmable calibration command translation layer (PCCTL) subsystem to receive the operational commands and to use the operational commands to generate granular level commands for controlling the elements. The method may further involve using a feedback control layer subsystem to receive the granular level commands and to generate final output commands which are applied to the elements, and to further modify the final output commands as needed to control the elements in closed loop fashion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure addresses the above described limitations with electronic control systems through a new, hierarchical control system and method. The systems and methods of the present disclosure decouple the array scale from data transfer rate to the main processing system. This solution provides a means to reach high bandwidth control for large arrays of feedback control systems while maintaining tractable requirements on control electronics.

Figure 1:
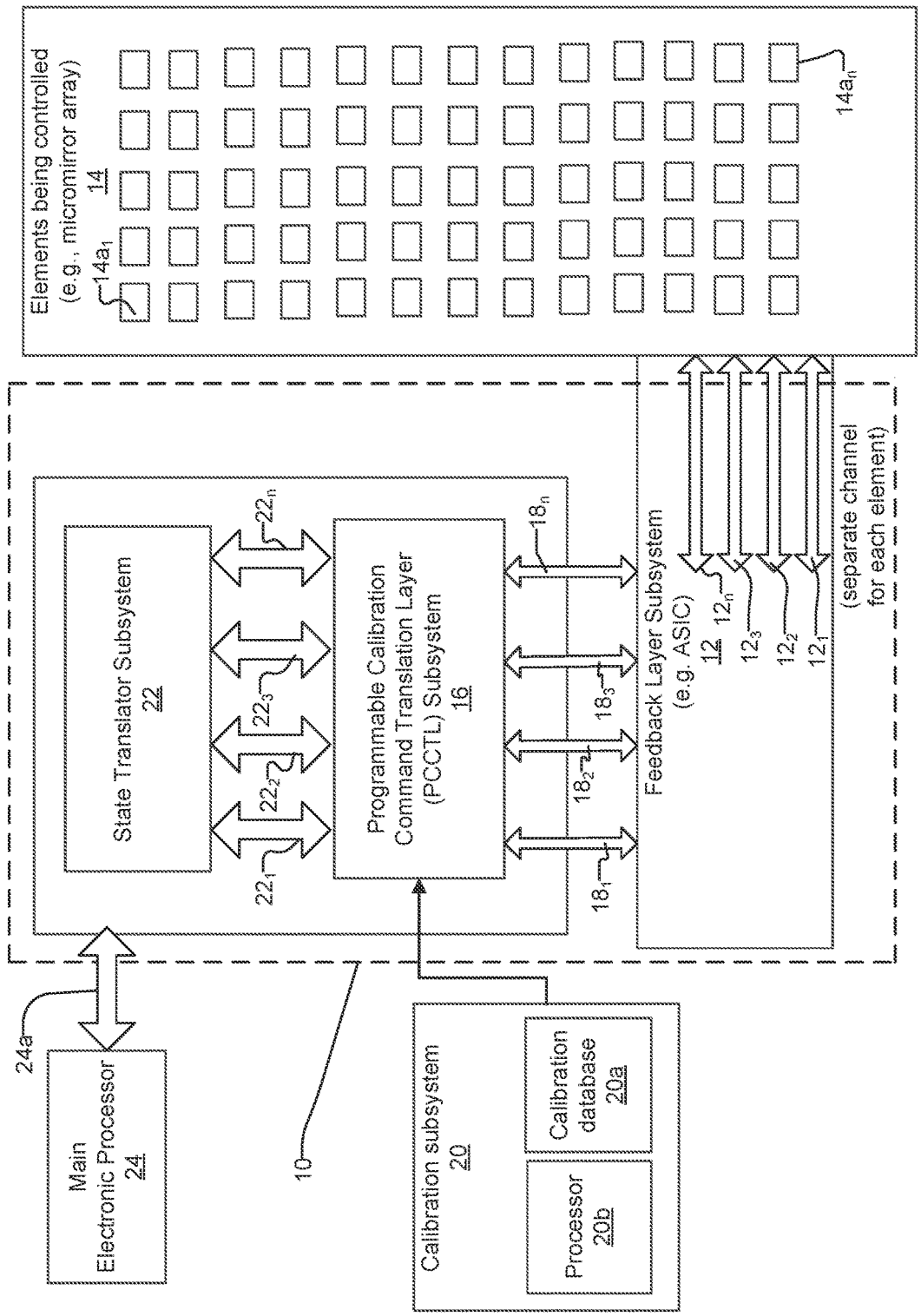
FIG. 1 is high level block diagram of one embodiment of a system in accordance with the present disclosure, where the system is being used, in this example, to control a large plurality of micro-mirror elements of an micro-mirror array.

Referring to FIG. 1, one embodiment of a system 10 in accordance with the present disclosure is shown. The system 10 in this example may include three distinct subsystems forming a distinct "level" of the overall system. At the most specific or lowest level, is a feedback layer subsystem 12 which may communicate directly with a plurality of elements, and in one example a large plurality of micro-mirror elements 14a of a micro-mirror array 14. It will be understood that the micro-mirror array 14 is but one subsystem that could be controlled by the system 10. The system 10 is potentially adaptable for use with a wide variety of other types of systems where a plurality of individual elements need to be controlled, often in real time, to accomplish a task. For example, other potential applications of the system 10 may include, without limitation, radiation emitting systems such as phased array RF or optical emitters with built in control, acoustic emitters such as ultrasonic arrays with built in control, actively stabilized sensors such as microresonator arrays, AFM probe arrays, adaptive optics arrays with active control for the cells. In each of these examples, the elements in the array would use closed loop feedback to improve their performance. This would enable the array systems in many cases to have performance and stability in excess of their present open-loop equivalents. This invention would resolve the data and computational challenge of managing the parallel control loops.

The feedback layer subsystem 12 receives granular level commands from a programmable calibration command translation layer ("PCCTL") subsystem 16, which in turn receives higher level "operational commands" from a state translator subsystem 22.

The feedback layer subsystem 12 may provide a low latency response to the individual micro-mirror elements 14a in order to keep the closed loop bandwidth as high as possible. The higher the bandwidth the greater the capability of each micro-mirror element 14a to reject unwanted signals and disturbances. Ideally, the feedback layer subsystem 12 should be located as physically close to the elements being controlled as practicable to reduce delays, stray signal acquisition and power demand. In one embodiment, the feedback layer subsystem 12 may be formed by an Application Specific Integrated Circuit (ASIC) which contains the feedback control circuitry in analog form and which is physically bonded or otherwise secured directly to a surface of the micro-mirror array 14, and which communicates with the elements 14a via a plurality of separate channels 121 through 12n. The feedback layer subsystem 12 receives feedback from the elements 14a and applies needed corrections to granular level commands to form final output commands which are determined in real time and applied to the elements 14a. The final output commands thus provide closed loop control over the functioning of each of the elements 14a of the micro-mirror array 14. There should ideally be no difference between the output command signals from the PCCTL subsystem 16 and the output performance of the array elements in a perfect environment, in which case closed loop feedback would not be needed and the commanded signal from the PCCTL subsystem 16 could be passed without modification to the array elements. In practical operation, however, unwanted disturbances are injected into the operation of the array from many sources. This includes but is not limited to noise in the input command to the elements, mechanical and thermal variation, unmodeled dynamics in the elements, and variation in material properties. All of these sources of variation cause the output of the array elements to vary from the desired commanded signal. Closed loop operation attempts to correct for these errors by observing the output and comparing to the commanded signal. The controller then modulates the input signal to the array elements to drive their output back to the targeted value determined by the PCCTL subsystem 16. This comparison and reaction to variation must occur with low latency and at bandwidths comparable to the variations, which is often high frequency. The feedback layer subsystem 12 acts as the interface between the commanded signals from PCCTL subsystem 16, and the measured performance of the array elements in order to keep the array performance aligned with the PCCTL commands.

The system 10 includes, at one level above the feedback layer subsystem 12, the PCCTL subsystem 16. The PCCTL subsystem 16 may be used to generate the specific commands (i.e. operational commands) for each element being controlled by the system 10, in this example each one of the micro-mirror array elements 14a. The PCCTL subsystem 16 communicates with the feedback layer subsystem 12 preferably in a parallel fashion via a plurality of parallel communication channels $18_1$-$18_n$, or in other words, via one communication channel per micro-mirror array element 14a. The PCCTL subsystem 16 may also receive calibration information from an independent calibration subsystem 20. The independent calibration subsystem 20 may have its own calibration database 20a stored in non-volatile memory and its own processor 20b. The calibration subsystem 20 may provide updated calibration data periodically to the PCCTL subsystem 16 which the PCCTL subsystem stores and uses to help generate the granular level commands. The granular level commands may be, for example and without limitation, voltages, currents, frequencies, etc., which are communicated in a parallel format via separate channels (i.e., one channel for each micro-mirror array element 14a), to the feedback layer subsystem 12 for controlling each of the micro-mirror array elements 14a. The PCCTL subsystem 16 may also be configured to receive some information from the feedback layer, for pass through to the layer above. This information may include, for example, the sensor readings from the array elements 14a. The PCCTL subsystem 16 would be able to translate these sensor readings to state parameters via the calibration information, so the state information can be passed to the layer above. In practice the calibration data enables the PCCTL subsystem 16 to transform or modify the commands as needed to reach a desired condition, state, level, etc. The calibration provides a mapping between the desired state behavior (tip, tilt and piston motion in the micro-mirror array example) with the internal parameter measurement (capacitance in the micro-mirror array). The layer above the PCCTL subsystem 16 works in the desired state behavior. The desired state behavior for each array element is passed down to the PCCTL subsystem 16. The PCCTL subsystem 16 translates this to the internal parameters that the feedback control will need to use in order to achieve the desired state behavior. The PCCTL subsystem 16 then outputs the internal parameters to the feedback layer below, which uses these values as the reference and command signals around which the loop is closed. The reason for parsing out the calibration layer as separate from the feedback control is that the calibration may be nonlinear and will be a measured (not predicted) quantity, meaning that it cannot easily be built into analog circuitry. Rather the calibration data is collected upon early use of the device, by applying commands to the array elements and measuring their state behavior. This generally occurs as a static mapping from input to output. Once this mapping is collected, the calibration is loaded into the PCCTL subsystem 16 to translate between state behavior and internal parameters.

The PCCTL subsystem 16 may additionally be used to apply feed-forward control to the signal. Feed-forward control modulates the command by dynamics that are intended to partially cancel the dynamics of the array element dynamics, in order to improve the overall system response. This feedforward operation is complex and tuned closely to the measured dynamics of the device. The feedforward generally acts as a dynamic calibration and is used in similar form as the static calibration. Both calibrations are mapped from input commands to observed behavior, then they are used in reverse to determine how to drive the array elements in order to achieve the desired behavior. The feedforward is therefore ideally carried out in the PCCTL subsystem 16 layer, which is already storing and using measured performance information (the static calibration). If feedforward is implemented in the PCCTL subsystem 16 layer, then the PCCTL subsystem layer communication to the feedback layer subsystem 12 would then include both an internal parameter reference command for the feedback loop and a feedforward command.

At the highest level, the system 10 may include a processor driven State Translator subsystem (ST) 22 that receives high level or state or abstract commands from an external or remote main electronic processor 24 via a bus 24a, and converts the abstract commands into the specific operational commands needed to control each of the array elements 14a to carry out the state commands (to achieve a desired state, condition, orientation, etc.). The bus 24a would only need to be a serial bus, as it is passing abstracted commands that govern the array 14 behavior as a whole. At this high level, the command is provided for the whole array 14, rather than for each array element $14a_1$-$14a_n$ independently. As an example, the micro-mirror array 14 would receive a command to generate a surface with set curvature from the main electronic processor 24. This may be a serial command, with updated curvature as needed, passing down the bus 24a. The highest level State Translator subsystem 22 would then convert this surface and curvature information into tip, tilt and piston commands for each of the micro-mirror array elements $14a_1$-$14a_n$. The array element commands leaving the State Translator subsystem 22 may be passed to the PCCTL subsystem 16 in parallel bus fashion. The State Translator subsystem 22 is also where different programmed modes of operation may be stored. The different programmed modes may correspond to how to command the elements 14a based on the received commands from the main processor 24. One example of a specific programming mode may be a mode which drives all of the elements 14a to the same state, digitally chaining them together and following the single state value passed to the state translator subsystem 22 by the main processor 24. Another option may be to have the dynamics programmed in, for instance high frequency motion where the main processor 24 passes along the frequency and the amplitude. Another option would be to provide array surface parameters from which each element state could be defined. In the case of the micro-mirror array 14, as an example, the State Translator subsystem 22 would be provided the desired surface curvature via the bus 24a. The State Translator subsystem 22 would calculate the state commands for each array element $14a_1$-$14a_n$ required to achieve this desired surface curvature. In all cases of inputs to the State Translator subsystem 22, the State Translator subsystem will generate the states as a function of time for each element 14a and pass these down in parallel form to the PCCTL subsystem 16 via channels $22_1$-$22_n$, potentially enabling commands at frequencies beyond the update capabilities of the main processor 24. The interpretation of the high level, abstract commands that the State Translator subsystem 22 performs on the commands received from the main processor 24 acts to unpack and translate the high level or abstracted commands into a more data intensive form to pass along to the parallelized data channels $18_1$-$18_n$. The State Translator subsystem 22 unpacks the abstracted serial input commands into parallel output commands guiding each array element $14a_1$-$14a_n$. This has the effect of placing the lowest data and latency burden on the main processor 24 so that arrays of elements 14a on a large scale and requiring high bandwidth can be driven by main processors with only limited processor and/or data handling capabilities. The State Translator subsystem 22 may also pass back up some limited information to the main electronic processor 24 as required by the application. This might include the feedback signals from the array elements.

As a specific example, in controlling the micro-mirror array 14, the state translator subsystem 22 may receive a high level command from the main processor 24 such as "set concave surface to radius=2 meters". The state translator subsystem 22 would receive this high level command and generate the specific operational commands for each element 14a of the micro-mirror array 14 needed to effect the 2 meter radius curvature for the overall micro-mirror array 14. These commands would be transmitted on channels $22_1\text{-}22_n$ to the PCCTL subsystem 16 which would use them to generate the needed corresponding granular level commands.

Figure 2:
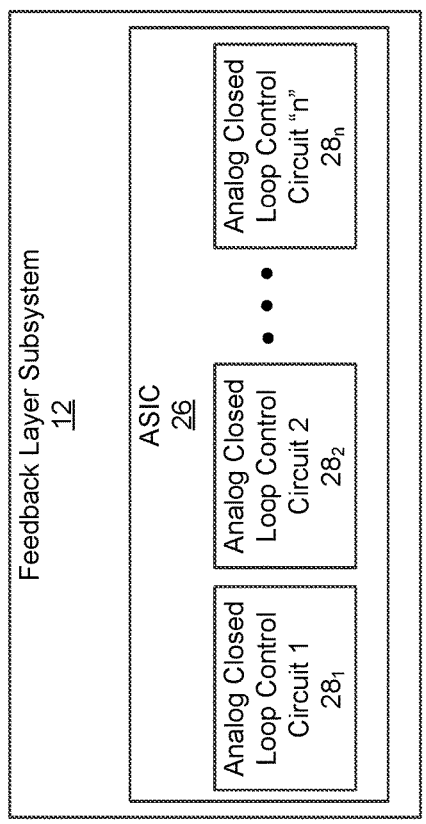
FIG. 2 is a high level block diagram of a feedback layer subsystem of the system and internal components that may be used to form the feedback layer.

Referring to FIG. 2, one example of a specific construction of the feedback layer subsystem 12 is shown. The feedback layer subsystem 12 may include an application specific integrated circuit ("ASIC") 26 having a separate analog, closed loop control circuit $28_1\text{-}28_n$ for each micro-mirror element $14a_1\text{-}14a_n$. As noted above, the ASIC 26 may be secured directly to the micro-mirror array 14 to minimize signal transmission delays, power usage and other variables that are affected by the signal transmission distance. The use of analog circuits for this layer is preferable because analog circuits can easily be tuned to operate with low latency and high bandwidth while requiring little area on a chip. The high performance and small size comes at the price of a lack of re-configurability, but this issue is resolved by the hierarchical arrangement of layers in the system 10, where programmable elements are included in the PCCTL subsystem 16 directly above the feedback layer subsystem 12. Analog circuits in some instances maybe difficult to tune, as the performance is dictated by physical elements in the circuit. Accordingly, the use of analog circuits for the feedback layer subsystem 12 provides a highly responsive layer, but with some limitations on adaptability.

Figure 3:
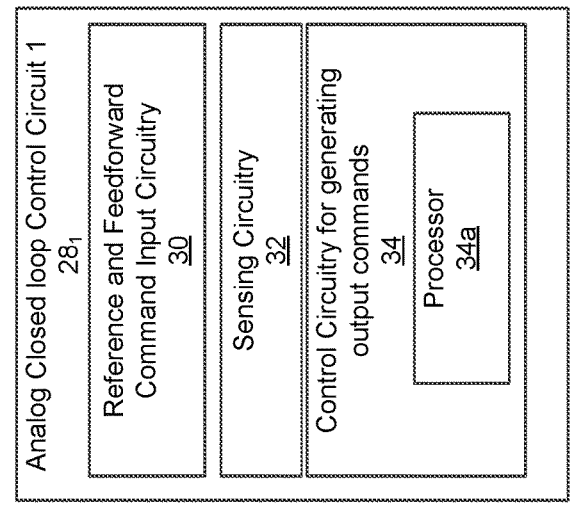
FIG. 3 is a high level block diagram of various components that may be used to form one analog control circuit of the feedback layer subsystem.

FIG. 3 illustrates one example of a more detailed construction for one of the analog closed loop control circuits $28_1$. This construction may be identical for all the analog closed loop control circuits $28_1\text{-}28_n$, or the construction may differ slightly between the circuits. In this example the construction of all of the analog control circuits $28_1\text{-}28_n$ are identical.

The analog control circuit $28_1$ may include reference and feedforward command input circuitry 30 for reading in commanded parameter values from the PCCTL subsystem 16 or from other analog closed loop control circuits. Sensing circuitry 32 may be included to read the resulting performance from its associated element $14a_1$ back into the analog closed loop control circuit $28_1$. Control circuitry 34, which may include a dedicated processor 34a (e.g., microprocessor), may be included for passing data in parallel between other ones of the analog closed loop control circuits $28_2\text{-}28_n$, for example to cancel out physical cross-talk between the elements $14a_1\text{-}14a_n$, and for generating the final output commands to be applied to the elements $14a_1\text{-}14a_n$. If a single array element $14a_1\text{-}14a_n$ is turned on, it may be useful to pass an attenuated opposite signal to the control circuits 34 of other ones of the analog closed loop control circuits $28_1\text{-}28_n$ to enable them to drive down any parasitic cross talk between elements. This could also be done on the layer formed by the PCCTL subsystem 16 if the effect has been measured and calibrated.

Figure 4:
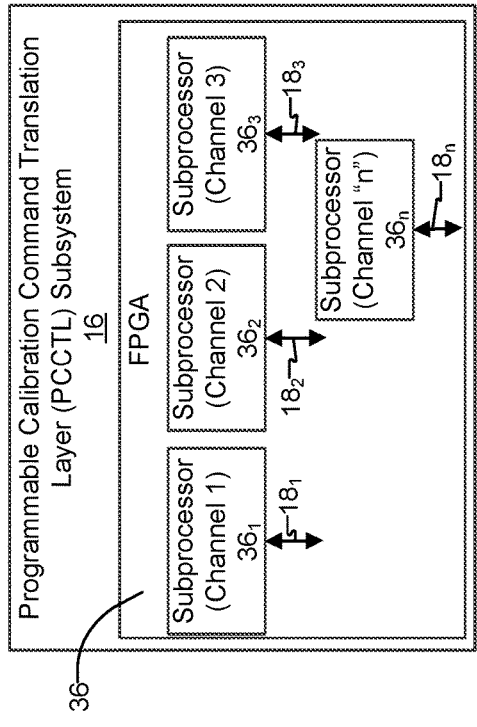
FIG. 4 is a high level block diagram of various components that may be used to form the programmable calibration command translation layer (PCCTL) subsystem.
Figure 5:
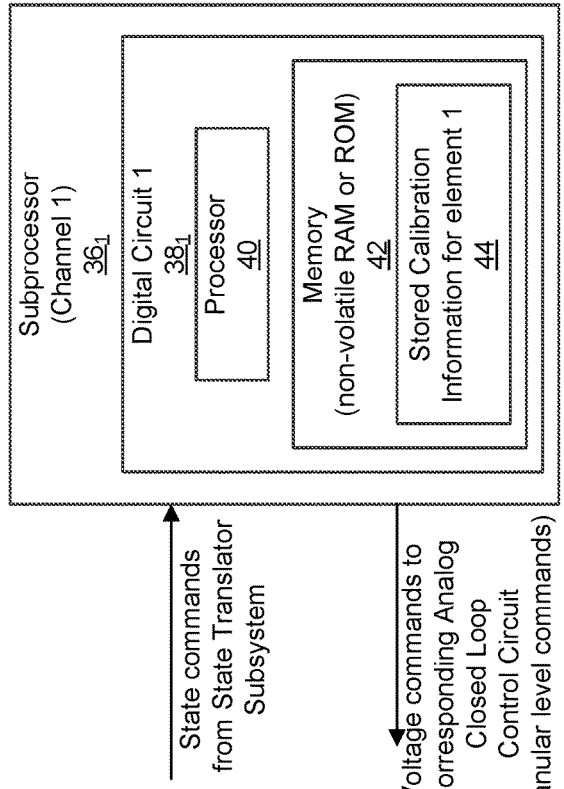
FIG. 5 is a high level block diagram of the components that one field programmable gate array (FPGA) of the PCCTL may include.

FIG. 4 illustrates in greater detail one example of how the PCCTL subsystem 16 may be constructed. The PCCTL subsystem 16 may be implemented on a Field Programmable Gate Array ("FPGA") 36 which is split, via programming, to have a plurality of subprocessors $36_1\text{-}36_n$. The subprocessors $36_1\text{-}36_n$ provide a dedicated sub-processor for each channel (i.e., one for each array element $14a_1\text{-}14a_n$), which each communicate on a dedicated one of the channels $18_1\text{-}18_n$. An example of the construction of one of the subprocessors $36_1$ is shown in FIG. 5. Each of the FPGA dedicated sub-processor $36_1\text{-}36_n$ essentially includes a small digital circuit 38 having a processor 40, non-volatile memory 42 (RAM or ROM) and stored calibration information 44 for its associated array element $14a_1\text{-}14a_n$. The digital circuit 38 may read in element specific state commands from the State Translator subsystem 22, may transfer information with other dedicated sub-processors and may generate specific voltage and/or current commands (i.e., the granular level commands) to its associated analog closed loop control circuit 28 which are needed to effect the control being commanded for each specific array element $14a1\text{-}14an$. The FPGA subprocessors $36_1\text{-}36_n$ are preferred because they can each be programmed to run in parallel at high speeds, and can also be overwritten with new calibrations as required.

Figure 6:
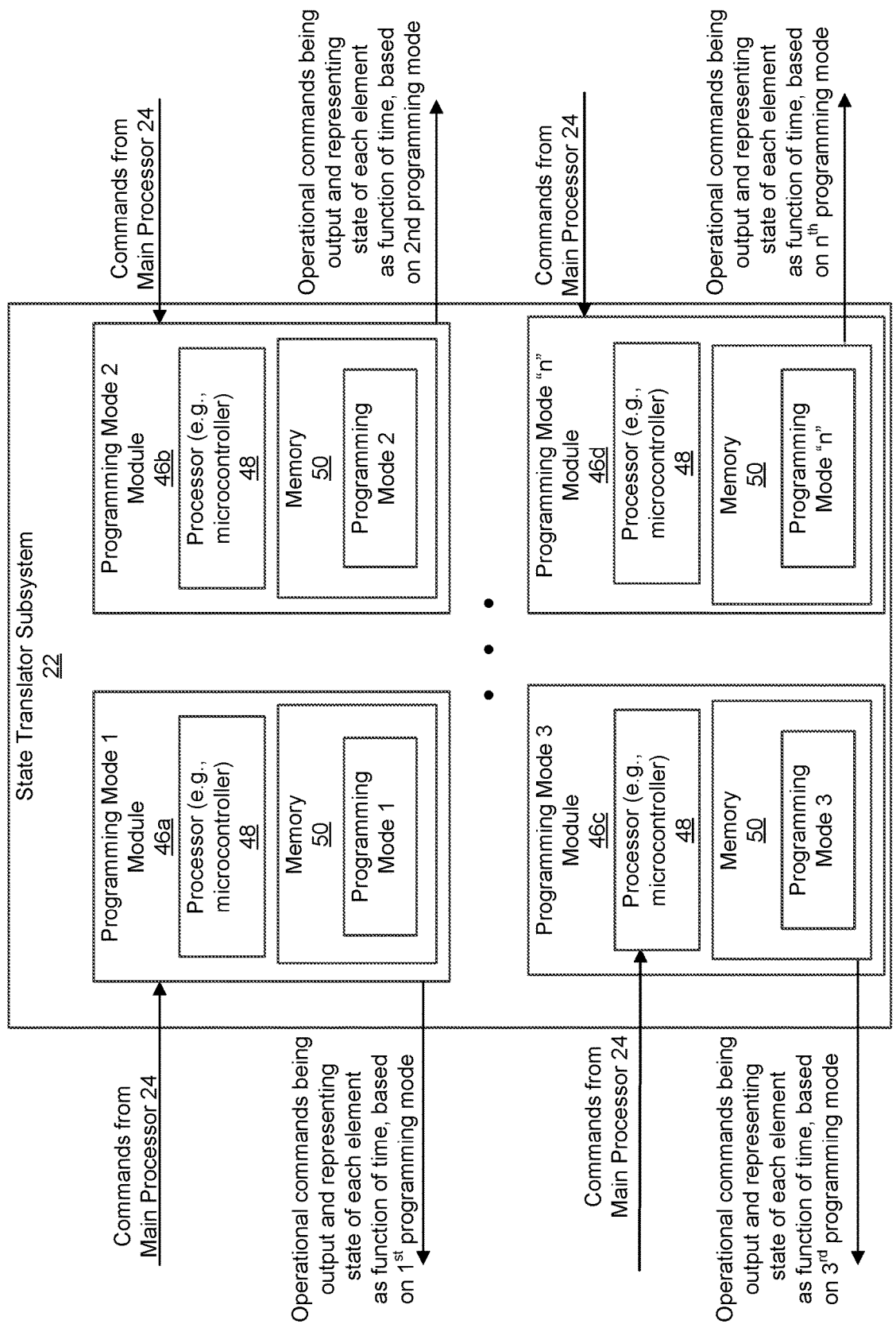
FIG. 6 is a high level block diagram of one example of the components that the state translator module may include.

Referring to FIG. 6, a more detailed view of the State Translator subsystem 22 construction is shown. The State Translator subsystem 22 may include a plurality of programming mode modules 46 that each correspond to a specific way to command the array elements $14a_1\text{-}14a_n$ based on the received high level state commands from the main processor 24. While FIG. 6 shows four distinct programming mode modules 46a-46d, it will be appreciated that a greater or lesser number of such modules may be included, depending on the different types of highly abstracted, packed data or instructions received from the main processor 24. The State Translator subsystem 22 could be formed by a single, central electronic processor where the modes are stored in programming on the processor. A centralized processor architecture would generally be acceptable for the State Translator subsystem 22 in cases when only a single mode is active at a given time. The centralized processor may be made of multiple processors to handle the calculations needed for large arrays. The commands from the main processor 24 would include a command designating which mode the State Translator subsystem 22 should be in, and then providing relevant parameters for that mode. Alternately, some uses for the array would benefit from simultaneous superimposed mode operation. For example, beam steering with a micro-mirror array for laser manufacturing could utilize the superimposed output of several modes in parallel. The first mode of bulk chained operation would be used to steer the entire array 14 in a raster pattern to act like a pointing mirror. A second mode driving surface curvature would be adapting the focal depth of the array 14 simultaneously with the raster motion, to act like an adjustable focus. Finally, a third mode for complex surface modulation could be used to carry out minor phase corrections needed to achieve diffraction limited beam quality. In the parallel modal operation case, the output of the modes would be summed when sent to the PCCTL subsystem 16. Each programming mode module 46a-46d may include a separate electronic processor 48 and a dedicated memory 50 to aid in parallel modal operation. One control methodology example that the State Translator subsystem 22 may follow, for example, is when receiving parameters for an aspherical optical surface, the State Translator subsystem may calculate the micro-mirror angle states required for each array element $14a_1$-$14a_n$ in order to mimic a commanded optical surface shape or contour. The microcontroller architecture is preferred for the State Translator Subsystem 22 due to the ease of programming and the centralized nature of the translation operation.

Figure 7:
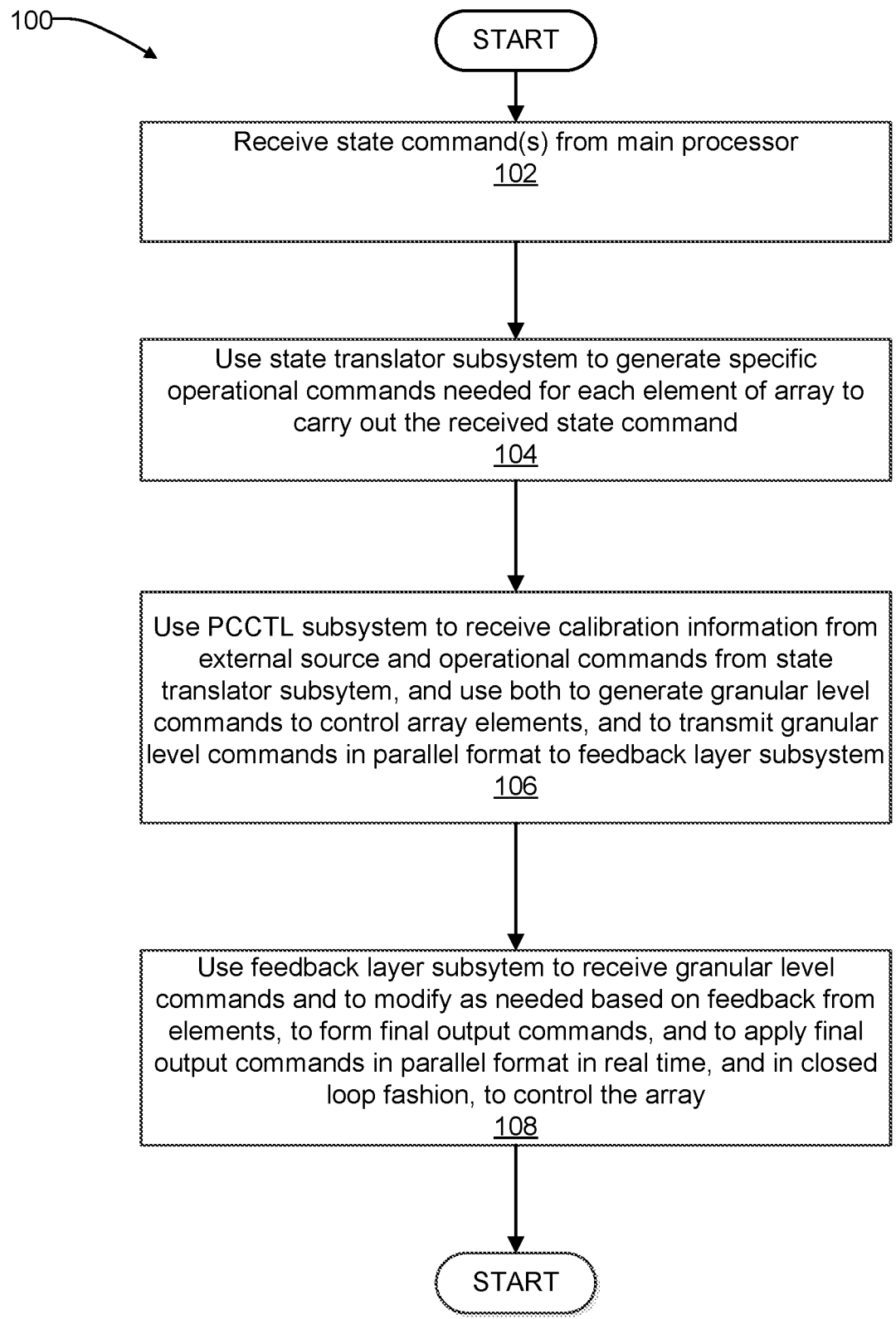
FIG. 7 is a flowchart illustrating high level operations that the system may perform in controlling the array elements.

Referring now to FIG. 7, a high level flowchart 100 is shown setting forth various operations that may be performed by the system 10 during its operation. At operation 102, the State Translator subsystem 22 may receive high level (e.g., abstract) state commands from the main processor 24 which instruct the system 10 to carry out some specific action, for example, creating a desired curvature of the micro-mirror array 14. At operation 104 the State Translator subsystem 22 analyzes the just-received state command(s) and generates the needed, specific, operational commands tailored to each array element 14a-14an of the array 14 to carry out the commanded state command(s). These specific operational commands are transmitted in parallel format over channels $22_1$ ... $22_n$ to the PCCTL subsystem 16.

At operation 106, the PCCTL subsystem 16 receives the calibration information from the external calibration subsystem 20 and the operational commands from the State Translator subsystem 22, and uses both to generate the granular level commands. The granular level commands are transmitted in parallel format over channels $18_1$-$18_n$ to the feedback layer subsystem 12.

At operation 108 the feedback layer subsystem 12 receives the granular level commands and determines any modifications required, based on feedback received from the elements 14a, before generating final output commands, and transmitting the final output commands in parallel format to the array elements $14a_1$-$14a_n$ using the channels $12_1$-$12_n$. The final output commands operate to control the array 14, in real time, to account for signal disturbances, signal drift, temperature influences, etc., to achieve the state command(s). The feedback layer subsystem 12 applies the needed modifications or corrections in closed loop form and in real time, to carry out operation of the array elements $14a_1$-$14a_n$ as needed to conform to the state command(s).

The systems and methods of the present disclosure provide a layered architecture for a control system which is able to achieve precision, closed-loop control over extremely large numbers of independent elements (e.g., hundreds, thousands or more), in real time, without the extreme computational, data transfer, and latency issues that would occur via implementation of a standard centralized architecture. The various systems and methods of the present disclosure are able to drive and control precision systems such as large arrays (e.g., micro-mirrors, micro-resonator phased array antenna elements, etc.), and to handle the multiple layers of information transfer required by large scale control systems, while minimizing the data flow and latency issues that result from attempting to provide all aspects of control using only one or more external controllers.

While the systems and methods have been described in connection with controlling array elements 14a of a micromirror array 14, it will be appreciated that the present teachings may be extended to control virtually any collection of feedback elements, and is expected to provide particularly utility to solve the computational complexity of control in systems where large numbers of precision elements need to be driven in parallel in order to ensure high performance system operation. The hierarchical setup described in the present disclosure provides a means to achieve large scale parallel control at low latency without incurring extreme computation or data transfer challenges.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An electronic control system for controlling individually controllable electromagnetic signal directing elements of an external component, the system comprising:
    a state translator subsystem comprising one or more processors for receiving a state command from an external subsystem, the state translator subsystem processing the state command and generating operational commands for controlling the elements of the external component to achieve a desired state or condition;
    a programmable calibration command translation layer (PCCTL) subsystem configured to receive the operational commands and using the operational commands to generate granular level commands for controlling the elements;
    a feedback layer subsystem configured to receive the granular level commands to generate final output commands to the elements, wherein the final output commands are modified as needed to control the elements in closed loop fashion;
    a first plurality of parallel communication channels independently communicating with granular level commands from the feedback layer subsystem to each one of the elements in parallel fashion and receiving feedback signals back from the elements over the first plurality of parallel communication channels;
    a second plurality of parallel communication channels coupling the PCCTL subsystem with the feedback layer subsystem supplying the granular level commands from the PCCTL subsystem to the feedback layer subsystem and receiving back the feedback signals from the feedback layer subsystem; and
    a calibration subsystem in communication with the PCCTL subsystem supplying calibration information to the PCCTL to modify the granular level commands when needed.

2. The system of claim 1, wherein the PCCTL subsystem is configured to receive the calibration information from the calibration subsystem, and to use the calibration information, together with the operational commands, to generate the granular level commands.

3. The system of claim 1, wherein the state translator subsystem applies the operational commands in parallel form to the PCCTL subsystem.

4. The system of claim 3, wherein the state translator subsystem generates one operational command for each element, and applies all the generated operational commands in parallel to the PCCTL subsystem.

5. The system of claim 4, wherein the PCCTL subsystem generates one granular level command for each element, and transmits the granular level commands in parallel format to the feedback layer subsystem via the second plurality of parallel communications channels.

6. The system of claim 5, wherein the feedback layer subsystem monitors the elements in real time and generates needed corrections or modifications, in real time, to the granular level commands, to form the final output commands required to carry out the state command.

7. The system of claim 1, wherein the feedback layer subsystem comprises an application specific integrated circuit (ASIC).

8. The system of claim 7, wherein the ASIC comprises a plurality of analog closed loop control circuits, each one of the plurality of analog closed loop control circuits being associated independently with a respective one of the elements.

9. The system of claim 8, wherein each said analog closed loop control circuit comprises:
    reference command input circuitry configured to read in commanded parameter values from the PCCTL subsystem, including the granular level commands;
    sensing circuitry configured to read a resulting performance from its associated element back into the analog closed loop control circuit; and
    control circuitry configured to generate the final output commands applied to the elements in closed loop fashion.

10. The system of claim 1, wherein the feedback layer subsystem is secured to a portion of the external component.

11. The system of claim 1, wherein the PCCTL subsystem includes a field programmable gate array (FPGA) configured via programming to provide a plurality of subprocessors, the subprocessors operable to process the calibration information and the operational commands.

12. The system of claim 11, wherein the FPGA is configured to provide a separate said subprocessor for each one of the elements.

13. The system of claim 12, wherein each said subprocessor includes a processor and a non-volatile memory, the memory operating to store the calibration information.

14. The system of claim 1, wherein the state translator subsystem includes a plurality of independent programming mode modules for implementing at least one of:
    a plurality of different program modes; and
    a plurality of different program schemes.

15. The system of claim 14, wherein each said programming mode module includes a processor and a memory.

16. A control method for controlling individually controllable electromagnetic signal directing elements of an external component, the method comprising:
    receiving, by a state translator subsystem comprising one or more processors, a state command from an external subsystem, the state translator subsystem for processing the state command and generating operational commands for controlling the elements of the external component to achieve a desired state or condition;
    receiving, by a programmable calibration command translation layer (PCCTL) subsystem, the operational commands and using the operational commands to generate granular level commands for controlling the elements;
    receiving, by a feedback layer subsystem, the granular level commands to generate final output commands which are applied to the elements, wherein the final output commands are modified as needed to control the elements in closed loop fashion;
    a first plurality of parallel communication channels independently communicating with the granular level commands from the feedback layer subsystem to each one of the elements in parallel fashion and receiving feedback signals back from the elements over the first plurality of parallel communication channels; and a second plurality of parallel communication channels coupling the PCCTL subsystem with the feedback layer subsystem supplying the granular level commands from the PCCTL subsystem to the feedback layer subsystem and receiving back the feedback signals from the feedback layer subsystem; and supplying, by a calibration subsystem in communication with the PCCTL subsystem, calibration information to the PCCTL subsystem to modify the granular level commands when needed.

\* \* \* \* \*